UNITED STATES PATENT OFFICE.

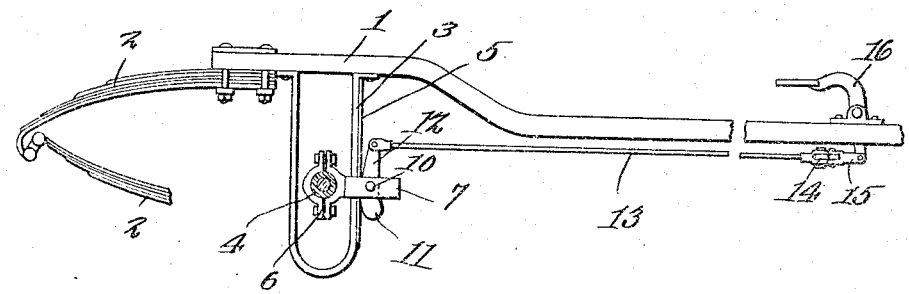

EMIL M. TOTZKE, OF ST. JOSEPH, MICHIGAN.

ACTION-CONTROLLING ATTACHMENT FOR VEHICLE-SPRINGS.

1,287,523.

Specification of Letters Patent. Patented Dec. 10, 1918.

Application filed June 1, 1917. Serial No. 172,249.

*To all whom it may concern:*

Be it known that I, EMIL M. TOTZKE, a citizen of the United States, residing at St. Joseph, in the county of Berrien and State of Michigan, have invented a new and useful Action-Controlling Attachment for Vehicle-Springs, of which the following is a specification.

This invention relates to an attachment for controlling the action of vehicle springs.

It is well known that considerable injury is often done to the springs of a vehicle and to other parts of the structure when the vehicle passes at a high speed over a depression or elevation in the path thereof, the excessive sagging and rebounding of the springs being unrestrained unless some form of shock absorber or the like is employed. Shock absorbers are usually undesirable because they interfere with the free movement of the springs under normal conditions.

One of the objects of the present invention is to provide means whereby the springs can move freely but, should they suddenly sag because of the movement of the car over a depression or an obstruction, the rebound can be promptly retarded by the driver so that excessive strain upon the springs or other parts of the car will be avoided.

A further object is to provide an attachment which can be applied readily to various makes of automobiles and other vehicles, which is cheap to manufacture, and which does not require the services of a skilled mechanic in order to place it in position.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

In said drawings:—

Figure 1 is a view partly in side elevation and partly in section of a portion of an automobile having the present improvements combined therewith.

Fig. 2 is a view partly in plan and partly in section of the structure shown in Fig. 1.

Fig. 3 is an enlarged side elevation of the brake shoe and adjacent parts.

Referring to the figures by characters of reference 1 designates a portion of the chassis of a vehicle and 2 designates a portion of a supporting spring at the rear end of the vehicle. Fixedly connected to each side of the chassis is a depending loop 3 adapted to extend past and under the axle 4 of the vehicle. This loop is rigid relative to the chassis 1 and is provided, on one face, with a wear strip 5 which can be of leather or any other material desired.

Secured upon the axle 4 adjacent each of the loops 3 is a clip 6 having a bracket 7 which extends along one side of the loop and is provided with a side finger 8 extending across the other side of the loop, this finger having a projection 9 which preferably extends into the loop so as to prevent the loop from being pushed back toward the axle 4.

Mounted on a pivot member 10 extending transversely through the arm 7 and the finger 8 is a brake shoe 11 from which projects an actuating arm 12. Rods 13 are pivotally connected to the upper ends of the respective arms 12 and are also pivotally connected to the ends of an equalizing bar 14 pivoted at its center on a link 15 which is connected to the lower end of a foot lever 16.

It will be apparent that under ordinary conditions the spring 2 can work as ordinarily and the loops 3 at the sides of the chassis will move upwardly and downwardly freely relative to the axle 4. However, should the vehicle sag to an objectionable extent as when passing suddenly over a depression or an obstruction, the operator can, by pressing on the upper end of lever 16, pull through rods 13 on the arms 12 so as to press the shoes 11 against the wear strips 5. Consequently the return or rebound of the springs will be retarded and shock thus practically eliminated.

The entire structure can be applied readily to a vehicle, and is advantageous because it does not ordinarily interfere with the free action of the springs.

What is claimed is:—

1. The combination with an axle and a yieldingly supported structure, of an arm connected to the axle, a rigid member fixedly attached to the structure and extending past the arm and axle, a finger extending from the arm, said finger and arm coöperating to hold said member against lateral movement relative to the axle, means upon the finger for holding the rigid member against movement toward the axle, a friction device carried by the arm, and means under the control of the operator for shifting said device into engagement with the rigid member.

2. The combination with an axle, and a yieldingly supported frame, of a rigid loop extending from the frame and projecting past the axle, a brake shoe supported by the axle and adjacent the loop, a foot lever, and means operated by the foot lever for shifting the shoe into engagement with said member to retard the movement of the member relative to the axle.

3. An attachment for vehicles, including a depending loop for attachment at its upper end to the chassis of a vehicle, a bracket for loosely straddling a portion of the loop, means for securing the bracket to a vehicle axle, a lever pivotally connected to the bracket, a brake shoe at one end thereof, means under the control of the driver for actuating the lever to press the shoe against the loop, and means on the bracket for backing the engaged portion of the loop.

In testimony that I claim the foregoing as my own, I have hereto affixed my signature in the presence of two witnesses.

EMIL M. TOTZKE.

Witnesses:
JOHN F. FLORIN,
ED. A. GASH.

Copies of this patent may be obtained for five cents each, by addressing the "Commissioner of Patents, Washington, D. C."